United States Patent
Nakade et al.

(10) Patent No.: US 6,600,508 B2
(45) Date of Patent: Jul. 29, 2003

(54) COMMUNICATION METHOD, COMMUNICATION SERVICE APPARATUS, COMMUNICATION TERMINAL DEVICE AND COMMUNICATION SYSTEM

(75) Inventors: Motoki Nakade, Tokyo (JP); Jun Tanaka, Tokyo (JP); Yoshito Shiraishi, Kanagawa (JP); Etsuo Kuroda, Tokyo (JP)

(73) Assignee: Somy Corporation, Tokyo (JP)

( * ) Notice: Subject to any disclaimer, the term of this patent is extended or adjusted under 35 U.S.C. 154(b) by 0 days.

(21) Appl. No.: 09/817,599

(22) Filed: Mar. 26, 2001

(65) Prior Publication Data

US 2001/0026314 A1 Oct. 4, 2001

(30) Foreign Application Priority Data

Mar. 27, 2000 (JP) ........................................ 2000-090745

(51) Int. Cl.[7] ................................................. H04N 7/14
(52) U.S. Cl. ................. 348/14.09; 348/14.08; 348/14.12
(58) Field of Search .......................... 348/14.01, 14.02, 348/14.03, 14.04, 14.05, 14.07, 14.08, 14.09, 14.1, 14.12, 14.13, 14.16; H04N 7/14

(56) References Cited

U.S. PATENT DOCUMENTS

| | | |
|---|---|---|
| 5,347,306 A | 9/1994 | Nitta |
| 5,450,123 A | 9/1995 | Smith |
| 5,710,591 A | 1/1998 | Bruno et al. |
| 5,949,475 A | 9/1999 | Hatanaka et al. |

FOREIGN PATENT DOCUMENTS

| | | | | |
|---|---|---|---|---|
| JP | 405095546 A | * | 4/1993 | ............ H04N/7/14 |
| JP | 406319139 A | * | 11/1994 | ............ H04N/7/15 |
| JP | 410313453 A | * | 11/1998 | ............ H04N/7/15 |
| JP | 02000078546 A | * | 3/2000 | ............ H04N/7/14 |

* cited by examiner

*Primary Examiner*—Melur Ramakrishnaiah
(74) *Attorney, Agent, or Firm*—Frommer Lawrence & Haug LLP; William S. Frommer

(57) ABSTRACT

The present invention provides an easy-handling and highly-convenient communication system having sufficient adaptability even when a user does not want to transmit a live picture. In a user database for a service provider system, the user establishes beforehand information on designating image data to be transmitted to a communicated party according to each communication condition such as time, the communicated party or the like, and registers the image data to be used in an image database. When connections are established between a plurality of users via an access provider system, a server apparatus receives the live pictures from each user, determines data to be transmitted to each user by referring to the user database, reads out contents of the image database as required, and transmits to each user selectively the live picture or the read-out image data.

46 Claims, 11 Drawing Sheets

FIG. 5

| A | B | C | D | E | DEFAULT |
|---|---|---|---|---|---|
| | LIVE | REGISTRATION 1 | FIXED FORMAT 2 | FIXED FORMAT 2 | FIXED FORMAT 1 |

| B | A | C | F | G | H | DEFAULT |
|---|---|---|---|---|---|---|
| | LIVE | LIVE | REGISTRATION 2 | REGISTRATION 2 | REGISTRATION 2 | REGISTRATION 1 |

| C | A | B | E | DEFAULT |
|---|---|---|---|---|
| | LIVE | LIVE | LIVE | LIVE |

| |
|---|
| FIXED FORMAT 1 |
| FIXED FORMAT 2 |
| FIXED FORMAT 3 |
| ⋮ |
| FOR CONTROL |
| USER A   REGISTRATION 1 |
| USER B   REGISTRATION 1 |
| USER A   REGISTRATION 2 |
| USER C   REGISTRATION 1 |
| USER B   REGISTRATION 2 |
| |
| |
| |
| ⋮ |

FIG. 12

| A | 21:00 ~ 8:00 | B | C | D |
|---|---|---|---|---|
| | REGISTRATION 1 | REGISTRATION 2 | NONE | LIVE |

COMMUNICATION METHOD, COMMUNICATION SERVICE APPARATUS, COMMUNICATION TERMINAL DEVICE AND COMMUNICATION SYSTEM

BACKGROUND OF THE INVENTION

1. Technical Field of the Invention

The present invention relates to a highly convenient communication method in a communication network capable of transmitting arbitrary data including a motion picture, a communication service apparatus providing such communication, a communication terminal device for performing such communication and a communication system as such.

2. Description of the Related Art

With the progress of communication technology and various data processing technologies including coding technology or the like, a portable terminal device has been developed, which is capable of processing a great amount of data such as a motion picture. It may be considered that such communication terminal device as capable of processing a real-time motion picture (hereinafter called "live picture", in some cases) will practically come into wide use when a shortly scheduled broadband communication network begins to be utilized. Additionally, as one of the devices which widely prevail among such communication terminal devices, there is considered the communication terminal device in the form of a videophone which is so far being put to practical use in various systems, namely, a portable communication terminal device capable of mutually transmitting live pictures.

However, as has been the case with the hitherto videophone, against such the communication terminal device, an attention has up to now been paid only to transmitting a live image, in other words, it has been positioned, in most cases, as a dedicated device for transmitting live image. For instance, Japanese Unexamined Patent Application Publication No. 2000-172611 discloses a technology that displays the image of WWW browser in a separate window within the videophone monitor, while calling with the videophones among multipoint. It also discloses the technology regarding the videophone system which includes a videophone device, a multipoint connecting device for controlling a videophone conference connected multipoint and a browser-coupled switching means which notifies as data the other videophone device via the above multipoint connecting device of the files as data which the videophone device downloads from a WWW server. However, this notifying data is notified to all the other connected videophones with the same content, and it is not such that data is notified after selected individually and separately.

As a consequence, a function as a communication means has not been sufficient and effective communication has not been performed. More specifically, there has been problems that adaptability when a user does not want to transmit, for instance, the live picture is insufficient, in addition to difficulty to use.

Moreover, data processing capability that permits real-time transmission of the moving image has not been utilized except for transmission of the live image. Therefore, there has been a demand to provide such a high value-added communication terminal device that more effectively utilizes such data processing capability.

SUMMARY OF THE INVENTION

Accordingly, the object of the present invention is to provide a communication method capable of an effective communication by making use of a real-time motion picture processing.

Another object of the present invention is to provide a communication service apparatus for rendering communication service capable of effective communication by making use of a real-time motion picture processing, a communication terminal device for using such communication service, and a communication system for providing such communication service.

Accordingly, in the communication method of the present invention, arbitrary data of each user is stored beforehand, a plurality of communication terminal devices is connected so as to allow simultaneous calls, a desired image is captured as required at each of the communication terminal devices, then the captured image data is transmitted to a server apparatus, and, at each of the communication terminal devices, either the image data transmitted from the pertinent communication terminal device or the data stored beforehand corresponding to the pertinent user is selected in accordance with the indication from the user related to the pertinent communication terminal devices, then the selected data is transmitted to the other connected communication terminal devices, and the data related to the other connected communication terminal devices is displayed on each of a plurality of the above connected communication terminal devices.

Preferably, the arbitrary data of each user is the data that includes at least the data to be displayed on the communication terminal device.

Specifically, the data corresponding to the user is the data that includes either one or a plurality of a static image and a moving image showing the pertinent user, a static image and a moving image showing the status of the pertinent user, or a static image and a moving image of arbitrary contents selected by the pertinent user, and the data including a configuration of the pertinent data having an addition of voice or a configuration having a photograph, a cartoon, an animation or a picture.

Preferably, each time the communication terminal device is connected with the other communication terminal device permitting simultaneous calls, the pertinent communication terminal device transmits a selection signal for selecting the data to the server apparatus, and selects, according to the transmitted selection signal, either the image data transmitted from the pertinent communication terminal device or the data stored beforehand corresponding to the pertinent user at the server apparatus.

Preferably, the communication terminal device transmits beforehand to the server apparatus the indication data for selecting the data at the server apparatus, then the transmitted indication data is stored in the server apparatus, and, when the communication terminal devices start communication, either the image data transmitted from the pertinent communication terminal device or the data stored beforehand corresponding to the pertinent user is selected at the server apparatus by referring to the stored indication data.

Preferably, the indication data is the data for specifying the data to be selected and transmitted to each of the other connected users, and also preferably, the indication data is the data for specifying the data to be selected and transmitted according to the conditions of connection.

Specifically, the indication data is the data for specifying the data to be selected and transmitted according to the connected time.

Specifically, the arbitrary data of each user is stored in the server apparatus, and the arbitrary data of each user is stored in the communication terminal device related to the pertinent user.

Further, the arbitrary data of each user is stored by distributing such data between the server apparatus, the communication terminal device related to the pertinent user, and the arbitrary other communication terminal device with possibility to be connected to the pertinent communication terminal device.

Specifically, the desired image is captured at each of the communication terminal device, and such captured image data is transmitted as required to the server apparatus and to the other communication terminal device with possibility to be connected to the pertinent communication terminal device, and stored in either one or in a plurality of the server apparatus, the pertinent communication terminal device or the other communication terminal device as the arbitrary data of the user related to the pertinent communication terminal device.

Preferably, a plurality of data for display is stored beforehand in the server apparatus, and the arbitrary data for display is selected from such a plurality of data for display stored beforehand, and stored in either one of or a plurality of members selected from the group of the server apparatus, the pertinent communication terminal device or the other communication terminal device as the arbitrary data of the user related to the pertinent communication terminal device.

Preferably, according to the condition of channels between a plurality of the connected communication terminal devices, the server apparatus determines data to be transmitted to each of the communication terminal devices and transmits, irrespective of the indication from the user.

Preferably, the arbitrary data including the desired image data is inputted in the communication terminal device, the inputted data is transmitted to the server apparatus, the transmitted data is stored in the server apparatus as the arbitrary data corresponding to the user related to the pertinent communication terminal device, and the stored data is transmitted to the desired communication terminal device in accordance with the request from the user related to the pertinent communication terminal device.

A communication service apparatus according to the present invention comprises a means for selecting, according to indication from each of a plurality of the communication terminal devices connected to be able to make simultaneous calls, either the image data to be transmitted from the pertinent communication terminal device or the data for display stored beforehand corresponding to the user related to the pertinent communication terminal device, and transmitting means for transmitting the selected data to the other communication terminal device connected to the pertinent communication terminal device to be able to make simultaneous calls.

Communication terminal devices of the present invention are interconnected via a communication service system and effect mutual calls, and comprise calling means for effecting call with another connected communication terminal device, receiving means for receiving predetermined data related to another user transmitted from the communication service system, displaying means for displaying the predetermined data related to the user of the pertinent called party when the above calling is effected, capturing means for capturing the desired image, image transmitting means for transmitting the image data obtained by the above capturing to the communication service system, and data indicating means for selecting and indicating, as the data to be transmitted to the communication terminal device of the pertinent called party, either the image data to be transmitted or the arbitrary data for display prepared beforehand when the calling is being effected.

A communication system of the present invention comprises a plurality of communication terminal devices, a storage device for storing desired data corresponding to the user of the pertinent communication system, and a communication service system for connecting between the arbitrary communication terminal devices in a manner capable of mutual communication and for transmitting, in accordance with the request from the communication terminal device, the desired data stored corresponding to the user related to the pertinent communication terminal device in the desired form and to the desired communication terminal device.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 5 is a view in schematic form showing data to be recorded in user database of the service provider shown in FIG. 4;

FIG. 6 is a view showing a recording situation of the image data in the image database of the service provider shown in FIG. 4;

FIG. 12 is a view explaining another specific example of the user database shown in FIG. 5.

DESCRIPTION OF THE PREFERRED EMBODIMENTS

Referring to FIG. 1 to FIG. 7 and FIGS. 8A to 8C, an embodiment of the present invention is described below. This embodiment refers to a communication system in the form of a videophone by which callers may transmit real-time moving images to each other. Particularly, the present invention is described by illustrating a communication system referred to as a party line, capable of communicating simultaneously among many callers.

First, there is described a configuration of the communication system by referring to FIGS. 1 to 6.

Figure 1:
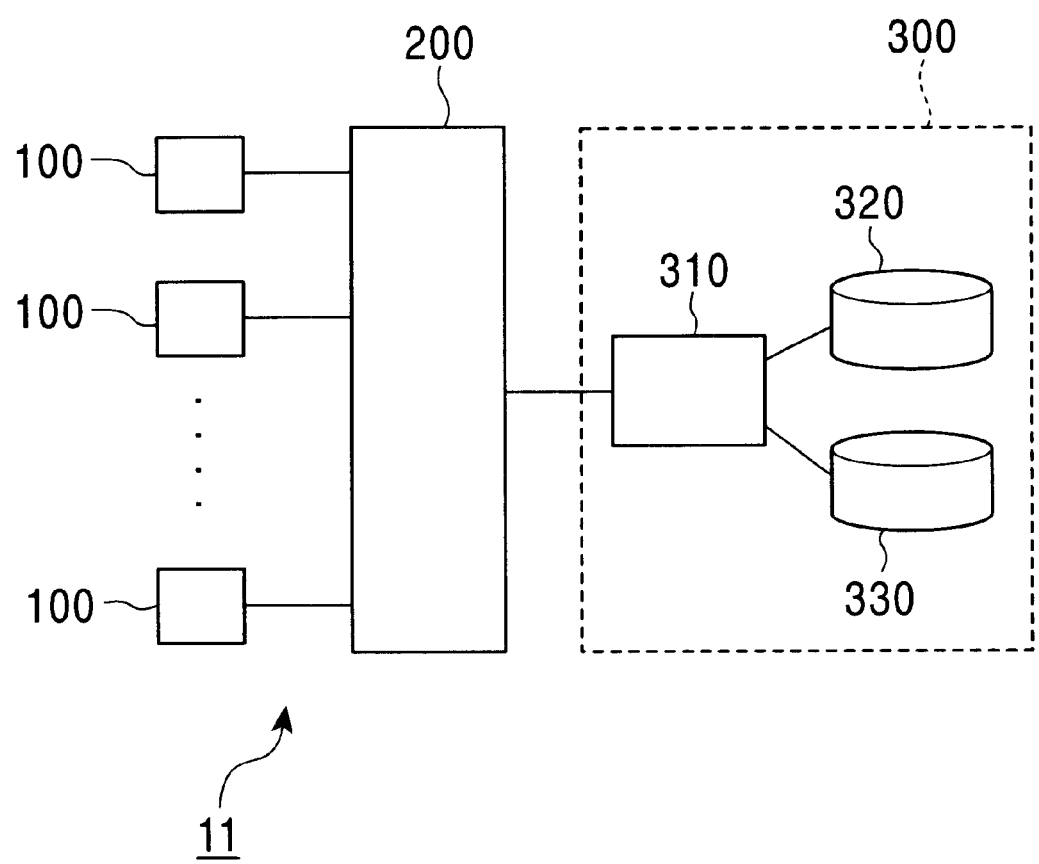
FIG. 1 is a block diagram showing a configuration of a communication system of one embodiment of the present invention.

FIG. 1 is a view showing a fundamental configuration of the communication system 11.

As illustrated, the communication system 11 comprises, as its fundamental configuration, a plurality of user terminal devices 100, an access provider system 200, and a service provider system 300.

The user terminal device 100 is a communication terminal device with functions of voice communication, image displaying, capturing a picture of a user and the like, so that users may communicate with each other by way of voice and image.

Figure 2:
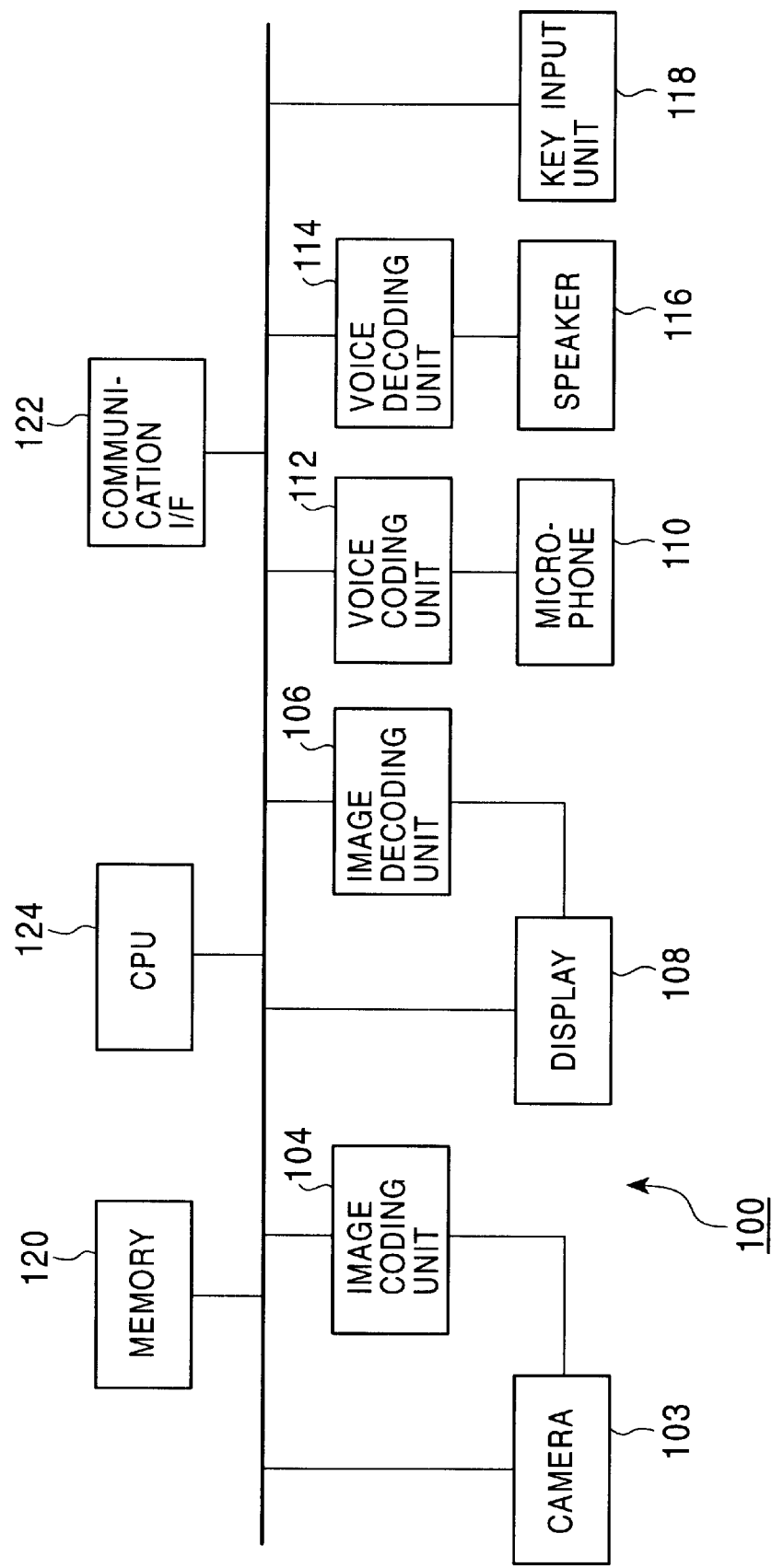
FIG. 2 is a block diagram showing a configuration of a user terminal device of the communication system illustrated in FIG. 1.
Figure 3:
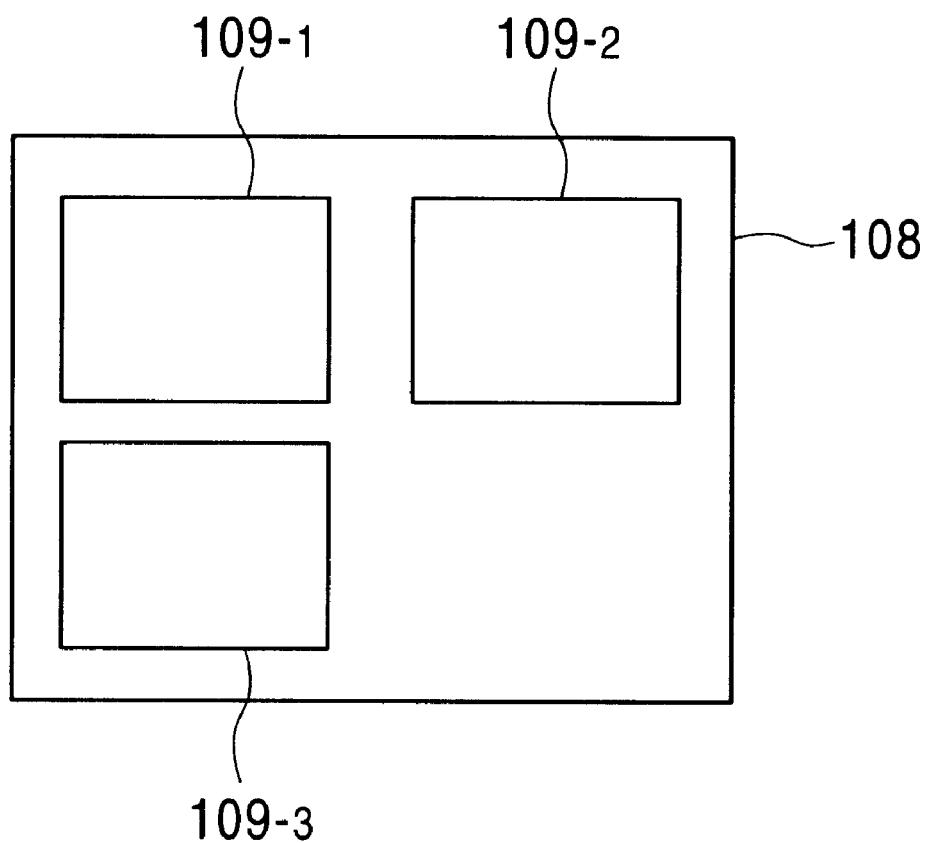
FIG. 3 is a schematic view showing an example of screen display on the display of the user terminal device shown in FIG. 2.

The user terminal device 100 is described in detail with reference to FIGS. 2 and 3.

The user terminal device 100 comprises a camera 103, an image coding unit 104, an image decoding unit 106, a display 108, a microphone 110, a voice coding unit 112, a voice decoding unit 114, a speaker 116, a key input unit 118, a memory 120, a communication I/F (Interface) 122 and a CPU (Central Processing Unit) 124.

The camera 103 is a compact CCD (Charge-Coupled Device) camera provided at the position from where the user may photograph the portion of his face when the user applies the user terminal device 100 under normal condition. When the user terminal device 100 is used, the camera 103 captures the user, and outputs an acquired image signal to the image coding unit 104.

The image coding unit 104 encodes the picture signal inputted from the camera 103 by the predetermined mode, and outputs to the communication I/F 122.

The image decoding unit 106 decodes each of the encoded image data of each called party which is received and inputted at the communication I/F 122, and applies to the display 108 after converting to a signal which is displayable on the display 108.

The display 108 displays the image data of each called party to be inputted from the image decoding unit 106. For instance, when the user is simultaneously calling three individuals including himself, three frames $109_{-1}$ to $109_{-3}$ adapting to each caller are displayed on the display 108 as shown, for example in FIG. 3, and real-time moving images of each caller (hereafter called a "live picture" in some cases) or specific image data or information or the like designated by each caller are displayed.

Additionally, the display 108, though not shown, also displays, according to control of CPU 124, information on using conditions or operation of the user terminal device 100.

The microphone 110 captures exterior voice including utterance of the user on calling, generates a voice signal and outputs to the voice coding unit 112.

The voice coding unit 112 encodes the voice signal inputted from the microphone 110 by the predetermined mode and outputs to the communication I/F 122.

The voice decoding unit 114 decodes encoded voice data received and inputted at the communication I/F 122, converts to a signal capable of outputting from the speaker 116, and applies to the speaker 116.

The speaker 116 outputs in sound voice a voice signal inputted from the voice decoding unit 114.

The key input unit 118 is an operating unit where the user dials a party to be called, sets various functions of the user terminal device, sets and requests various services for the service provider system 300. The setting for the service provider system 300 is that of designating image data or the like displayed on the terminal device of the called party.

The memory 120 stores various data of not only a processing program for controlling the whole user terminal device conducted by the CPU 124 and data for setting function and operation of the user terminal device 100, but also intermediate data in process at the CPU 124, data transmitted among each component unit and intermediate data in process at each component unit.

As data particularly related to the present invention, information about a called party, communication conditions or specific image data to be displayed by operation on a display 108 of the user terminal device 100 which is being used by a called party, and also a specific image data to be displayed on the display 108 by instructions from a called party whom the user terminal device 100 is related to and has the possibility to communicate with, are stored in the memory 120.

The communication I/F 122 performs modulation, demodulation and protocol control, and actually communicates with an outside device. A voice data inputted to the microphone 110 and encoded by the voice coding unit 112, and an image data captured by the camera 103 and encoded by the image coding unit 104 are transmitted from the communication I/F 122 to the service provider system 300 via the access provider system 200. In addition, data transmitted from the service provider system 300 via the access provider system 200 is received by the communication I/F 122 and outputted to the image decoding unit 106, the voice decoding unit 114 or the CPU 124 or the like.

The CPU 124 operates according to a program stored in the memory 120 and controls each unit of the user terminal device 100 so that the user terminal device 100 may perform desired operation. Accordingly, it may be understood that the memory 120 is comprised of a read only memory (ROM) which stores this program and a random access memory (RAM) which stores and reads out the image data or the like.

In such configured user terminal device 100, the communication I/F 122 begins to communicate with the outside device according to control of the CPU 124 by operation, for example, of the key input unit 118 by the user.

When a channel is secured, a voice uttered by the user is captured by the microphone 110 and converted to a digital coding signal at the voice coding unit 112, and a picture of the user is captured by the camera 103 and converted to a digital coding signal at the image coding unit 104. Each of them is transmitted from the communication I/F 122. A voice signal of a communicated party received at the communication I/F 122 is decoded at the voice decoding unit 114 and outputted from the speaker 116, and a picture signal of a communicated party received at the communication I/F 122 is decoded at the image decoding unit 106 and displayed on the display 108.

With this procedure, a call in the form of Videophone with an arbitrary called party is available. Additionally, by utilizing a service provided by the service provider system 300 described later, a simultaneous communication with three or more users is available.

In making such basic calls, based on operation of the key input unit 118 of the user or by a service provided by the below-described service provider system 300, various forms of calls related to the present invention are available, which will be described bellow in detail.

The access provider system 200, according to requests from each a nodal device, effects a line connection between arbitrary nodes on a communication network provided by the access provider system 200 including the user terminal device 100 and the service provider system 300, whereby communication between each device may be available.

As a processing related to this embodiment, an arbitrary user terminal device 100 requests the service provider 300 for a primary connection, so that the access provider system 200 effects a line connection between this user terminal device 100 and the service provider system 300 in reply to the above request. In the case where the request of connection by this user terminal device 100 is that of a call to the other user terminal device 100, the access provider system 200, in reply to the request of the service provider system 300, effects a secondary line connection between the access provider system 300 and the user terminal device 100 used by a called party.

Thus, a communicable environment is provided between the user terminal device 100 originating request for connection and the user terminal device 100 of a called party via the service provider system 300.

Incidentally, the access provider system 200 connects each device through various formed channels, but ultimately connects each device through the channels having enough bandwidth capable of transmitting real-time moving images.

The service provider system 300 is a server apparatus providing various communication services to each of a plurality of the user terminal devices 100 via the access provider system 200.

Fundamentally, the service provider system 300 intermediates connections between a plurality of the user terminal devices 100 and provides those of the user terminal devices 100 with a communication service in the form of a videophone including mutual transmission of moving images. In that case, the communication services makes it possible to transmit not only a simply captured real-time picture but also other moving image data, static image data or arbitrary information as replaced data for display, according to the request from the user, specific condition or the like.

Referring to FIG. 1 and FIGS. 4 to 6, there is described such service provider system 300.

Figure 4:
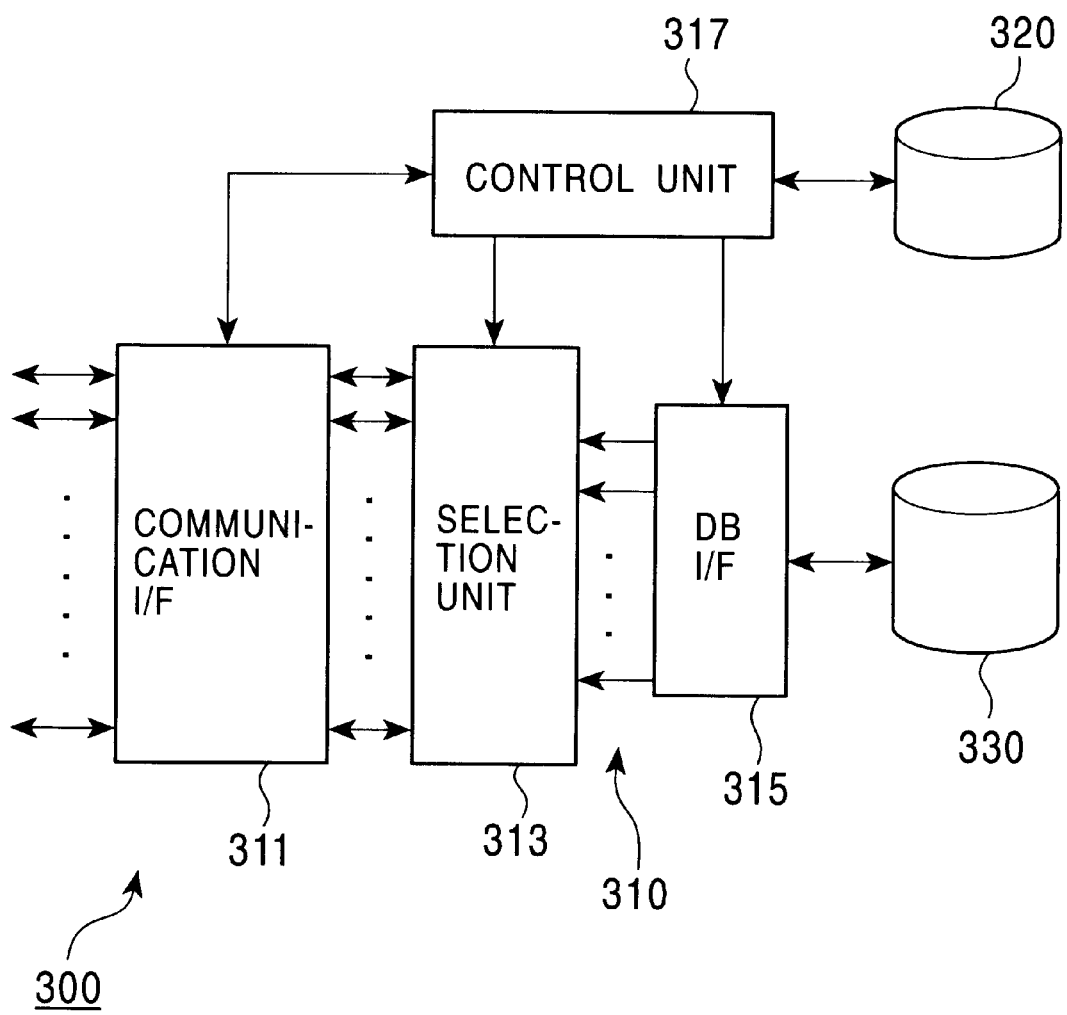
FIG. 4 is a block diagram showing a formation of a service provider of the communication system shown in FIG. 1.

FIG. 4 is a block diagram showing a configuration of the service provider system 300.

As shown in FIGS. 1 and 4, the service provider system 300 comprises a server apparatus 310, a user database 320 and an image database 300, and, as shown in FIG. 4, the server apparatus 310 includes a communication I/F 311, a selection unit 313, a database I/F 315 and a control unit 317.

The communication I/F 311 of the server apparatus 310 is connected via the access provider system 200 to the user terminal device 100, and communicates with each of the user terminal device 100 to provide predetermined services.

Normally, the line connection between the user terminal device 100 of a caller originating a request for connection for call, and the user terminal device 100 of a called party to whom connection is requested, is done to the communication I/F 311 via the access provider system 200. The communication I/F 311, when receiving the voice signal and the image signal related to the call from each of these user terminal devices, outputs them to the selection unit 313, and also transmits the voice signal and the image signal related to the call inputted from the selection unit 313 to each of the user terminal devices 100. Also, when a control signal for setting conditions or the like against the service provider system 300 is transmitted from the user terminal device 100, the communication I/F 311 outputs it to the control unit 317.

Irrespective of a call, when the user terminal device 100 is connected to the communication I/F 311 for making the setting of the connecting conditions for receiving services or of the image data to be used, the communication I/F 311 outputs to the control unit 317 a control information or the like received from this user terminal device 100. When the control signal against such the user terminal device 100 is inputted from the control unit 317, the communication I/F 311 transmits this to the user terminal device 100.

The selection unit 313, based on the control by the control unit 317, selects and controls data to be mutually transmitted between each connected two or more user terminal devices 100 connected to the service provider system 300.

From the communication I/F 311 to the selection unit 313, the voice data and the picture data which are transmitted from each of the user terminal devices 100 are inputted for each connection consisting of a plurality of the user terminal devices 100 making mutual calls. Regarding the voice data, the selection unit 313, for the purpose of transmitting to all the connected user terminal devices 100, outputs to the communication I/F 311 the received voice data as transmitting data to each of the pertinent user terminal devices 100.

On the other hand, regarding the picture data, the selection unit 313, through each combination of the user terminal device 100 originating transmission of the picture data and the user terminal device 100 receiving the transmitted picture data, selects by a control of the control unit 317, either the received picture data or the other image data stored in the image database 330, and outputs to the communication I/F 311 for transmitting the selected image data to the user terminal device 100 of the transmitted party.

Though described later, the control unit 317 controls selection of such image data by referring to information on transmitting condition for image data of each user stored in the user database 320. Accordingly, by this processing, it becomes possible to transmit arbitrary static image or moving image to the specific party according to the desire of the user, and it becomes easy to make use of the communication system in the form of videophone of this kind permitting transmission of real-time picture, in comparison with the case of simply transmitting live pictures mutually between each of the user terminal devices 100.

The database I/F 315, based on control from control unit 317, reads out the desired image data from the image database 330 and outputs from the predetermined channel to the selection unit 313. From the database I/F 315 to the selection unit 313, there are a plurality of input-output channels through which the image data can be outputted simultaneously and in parallel, and the database I/F 315 reads out a plurality of the image data in practically simultaneous manner, and outputs to the selection unit 313 via the predetermined channel.

Based on the connecting condition inputted from the communication I/F 311, the control signal directly inputted from the user terminal device 100 via the communication I/F 311 and information on transmitting condition of the image data of each user recorded in the user database 320, the control unit 317 determines the image data to be transmitted to each of the user terminal devices 100 of each established connection, and controls the selection unit 313 so that the determined image data may adequately be transmitted to each of the user terminal device 100. In that case, the control unit 317 controls the database I/F 315 to read out the required image data from the image database 330 and output to the selection unit 313.

When information on transmitting condition of new image data is inputted from the user terminal device 100 via the communication I/F 311, the control unit 317 updates the user database 320 accordingly.

Additionally, when the new image data or data for display are inputted from the user terminal device 100 via the communication I/F 311, the control unit 317 stores them in the image database 330 via the database I/F 315.

The user database 320 is the database which records for each user the data for display to be used against the other user with whom communication is conducted.

Specific examples of the data to be recorded in the user database 320 are shown in FIG. 5.

In the example shown in FIG. 5, when a user A communicates with the a B, the setting is made such that, as the image data to be transmitted to the user B, namely as the image data displaying on the user terminal device $100_{-B}$ of the user B, the live image is used, namely the data captured at the user terminal device $100_{-A}$ of the user A at the time of calling and then transmitted When the user A calls the a C, the setting is made such that the user A selects a first registered image data registered beforehand in the image database 330 of the service provider system 300, and that when the user A calls users D and E, a second fixed format image data, which has beforehand been prepared by the service provider system 300 and stored therein, is selected.

For the other users who have not made the setting (default), the setting is made such that the user A selects a first fixed format image data which has beforehand been prepared by the service provider 300 and stored therein.

As for the user B, the setting is made such that when he calls the users A and C, the live picture is transmitted from the beginning, and when calling users F, G and H, a second registered image data registered beforehand in the image database 330 is used, and also as the default, a first registered image data registered beforehand in the image database 330 is used.

Further, as for the user C, the setting is made such that the live picture is transmitted to any of the users A, B and E, and, furthermore, the live picture is also transmitted as the default.

The image database 330 is the database recording the image data to be transmitted to each of the user terminal devices 100.

FIG. 6 shows a recording situation of data at the image database 330.

In the image database 330, fixed format image data, image data for controlling and registered image data are recorded in the arrangement, for example, as shown in FIG. 6.

The fixed format image data is the image data which has beforehand been prepared by the service provider system 300 and for which the user substitutes when, for example, the user does not want to transmit the live picture to a called party. In this embodiment, there are registered static image data of cartoon pictures depicting some facial expressions of a normal face, an angry face, a delighted face or the like, or image data of simple landscape.

In addition, data for controlling is the data to be transmitted as a substitute when the desired image data cannot be transmitted due to some influences caused by communication channels, processing capability of the service provider system 300 or the like, and in this embodiment, it refers to the image data of simple pattern with a little amount of data.

Still, registered image data is image data that each user registers to use in place of a live picture, and is an arbitrary image showing, for example, a static image of the user, a simple moving image of specific behavior including laughing, a cartoon picture depicting the user, an image showing the matter which the user has interest, or the like.

In such image database 330, by the database I/F 315, image data designated by the user terminal device 100 whose connection is established is read out at high speed. In addition, newly registered image data from the user is recorded as appropriate via the database I/F 315.

Next, referring to FIG. 7 and FIGS. 8A to 8C, there is described an operation of such communication system 11.

Figure 7:
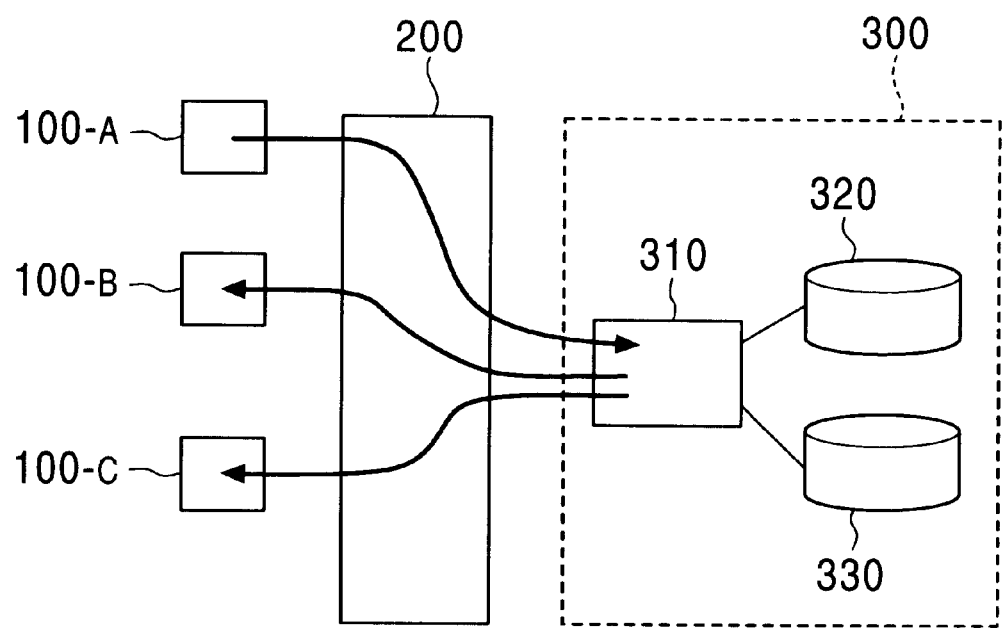
FIG. 7 is a view explaining an operation of the communication system shown in FIG. 1.
Figure 8A:
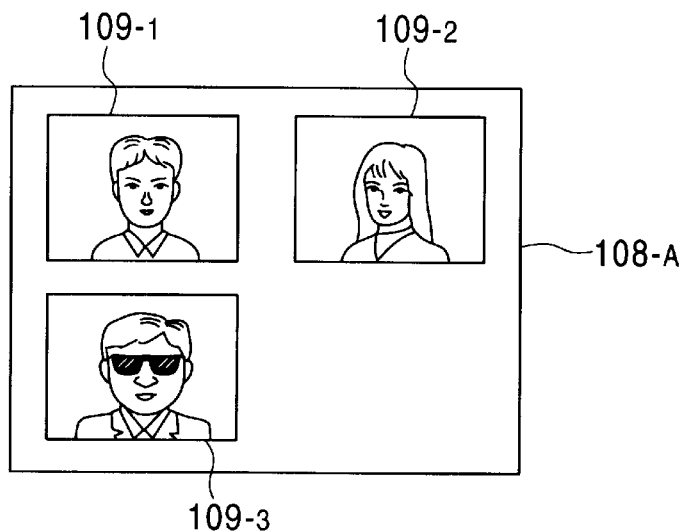
FIGS. 8A, 8B and 8C are views showing an appearance on the display of the user terminal device of each user of the communication system shown in FIG. 1.
Figure 8B:
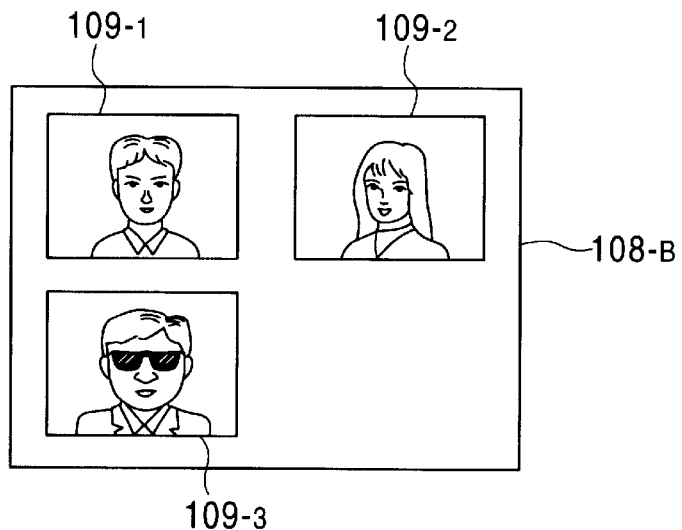
Figure 8C:
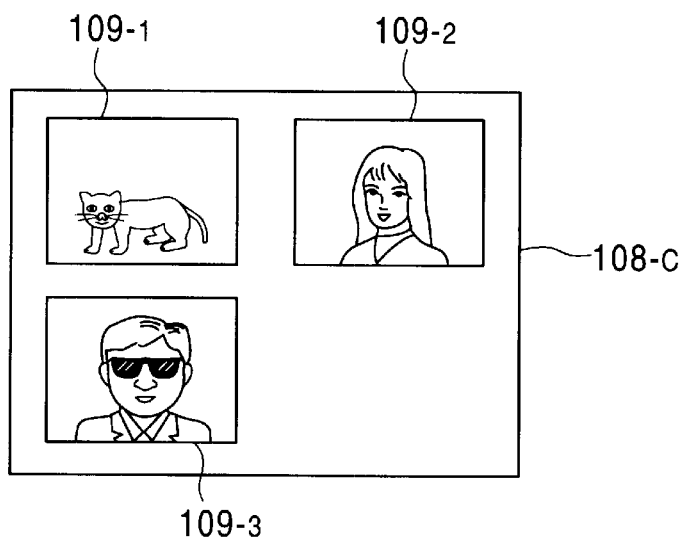

FIG. 7 is a schematic view to describe the operation of the communication system 11 and FIGS. 8A to 8C are schematic views showing the situations of the displays 108 of the user terminal devices 100 of each user.

As shown in FIG. 7, description is made by adopting an example of the case where each user calls under such an environment that the three user terminal devices $100_{-A}$, $100_{-B}$ and $100_{-C}$ related to the three users A, B and C are connected capable of simultaneous calls.

To begin with, the user A operates the key input unit 118 to call the users B and C and, according to this operation, the access provider system 200 establishes a line connection between the user terminal device $100_{-A}$ of the user A and the service provider system 300.

The request for connection to the users B and C from the user terminal device $100_{-A}$ is inputted to the control unit 317 via the communication I/F 311 of the service provider system 300. Based on the control by the control unit 317, the service provider system 300 requests the access provider system 200 to establish line connections to each of the user terminal devices $100_{-B}$ and $100_{-C}$ of the users B and C.

In addition, in reply to this request, the access provider system 200 calls up each of the user terminal devices $100_{-B}$ and $100_{-C}$, and the users B and C put the respective user terminal devices $100_{-B}$ and $100_{-C}$ in communicating condition, whereby line connections between the service provider 300 and each of the user terminal devices $100_{-B}$ and $100_{-C}$ are established.

Meanwhile, the control unit 317 of the service provider system 300 conducts a check of each setting of image data to be transmitted among each of the users A, B and C by referring to the user database 320. For instance, when the setting of the user database 320 is as per indicated in FIG. 5, each live image may be transmitted, from the user A to the user B, from the user B to the users A and C and from the user C to the users A and B, but only from the user A to the user C, a first image data which the user A has registered beforehand is arranged to be transmitted instead of the live image.

Accordingly, the control unit 317 instructs the database I/F 315 to read out a first registered image data of the user A from the image database 330, and the database I/F 315, based on the instructions, reads out a first registered image data of the user A from the image database 330 and outputs to the selection unit 313.

In the situation that connection is established between the service provider system 300 and each of the user terminal devices $100_{-A}$, $100_{-B}$ and $100_{-C}$ as described above, the voice signal and the image signal are transmitted to the selection unit 313 from each of the user terminal devices $100_{-A}$, $100_{-B}$ and $100_{-C}$ via the communication I/F 311.

With respect to the voice signal, the selection unit 313 selects the inputted signal from each of the user terminal devices $100_{-A}$, $100_{-B}$ and $100_{-C}$ so as to transmit to all the user terminal devices $100_{-A}$, $100_{-B}$ and $100_{-C}$ and outputs to the communication I/F 311.

With regard to the image signal, the selection unit 313 conducts the signal selection for the user terminal devices $100_{-A}$ and $100_{-B}$ of the users A and B so as to transmit the signals inputted from each of the user terminal devices 100$_{-A}$, 100$_{-B}$ and 100$_{-C}$ as they are. In addition, for the user terminal device 100$_{-C}$ of the user C, the selection unit 313 transmits the image signals from the user terminal devices 100$_{-B}$ and 100$_{-C}$ of the users B and C as they are, but does not transmit the image signal from the user terminal device 100$_{-A}$ of the user A, and instead, transmits a first registered image data of the user A inputted from the database I/F 315 as the image signal related to the user A.

FIGS. 8A to 8C show images displayed on the displays 108 of each of the user terminal devices 100$_{-A}$, 100$_{-B}$ and 100$_{-C}$ when each image signal is transmitted as described above.

FIG. 8A is a view showing the display 108$_{-A}$ of the user terminal device 100$_{-A}$ of the user A, FIG. 8B shows the display 108$_{-B}$ of the user terminal device 100$_{-B}$ of the user B and FIG. 8C shows the display 108$_{-C}$ of the user terminal device 100$_{-C}$ of the user C.

As shown in FIGS. 8A to 8C, on the displays 108$_{-A}$, 108$_{-B}$ of the user terminal devices 100$_{-A}$, 100$_{-B}$ of the users A and B, three live pictures of each three users are displayed on three frames of 109$_{-1}$ to 109$_{-3}$.

However, on the display 108$_{-C}$ of the user terminal device 100$_{-C}$ of the user C, only a static picture is displayed on the frame 109$_{-1}$ where the live picture of the user A should be displayed, and the live picture of the user A is not displayed.

Still, under such situation, when any of the users wants to change the condition of the image to be transmitted, a predetermined operation from the key input unit 118 of the user terminal device 100 is performed. As a consequence, the control signal based on this operation is inputted to the control unit 317 via the access provider system 200 and the communication I/F 311, and by the control unit 317, the selection unit 313 and the database I/F 315 are controlled, whereby the condition of the image data to be transmitted is changed.

For instance, in such the case where the user A notices that there is no problem in transmitting the live picture to the user C, when the user A performs the predetermined operation in the user terminal device 100$_{-A}$, the signal based on this operation is inputted to the control unit 317 of the service provider system 300, and the control unit 317 indicates the selection unit 313 to transmit the live picture from the user terminal device 100$_{-A}$ of the user A as it is to also the user terminal device 100$_{-C}$ of the user C. As a consequence, also on the display 108$_{-C}$ of the user terminal device 100$_{-C}$ of the user C, the live picture of the user A is displayed. At this time, the control unit 317 also instructs the database I/F 315 so as to suspend reading out the registered image data of the user A from the user database 330.

Conversely, for any of the users having already transmitted the live picture to the called party, when the situation has occurred that he does not want the live image to be viewed by the called party, by having the pertinent user instructing the terminal device 100 and performing an operation in order to designate an alternative image, the signal based on these instructions is inputted to the control unit 317 of the service provider system 300, and the control unit 317 instructs the selection unit 313 to transmit the designated image in place of the live picture from the pertinent user to each of the connected parties. As a consequence, on the displays 108 of the user terminal devices 100 of all the connected parties, the live pictures of the pertinent user are not displayed, and instead the alternative images are displayed.

In addition, in the situation of continuing calls in such condition, when the image data cannot be transmitted in real-time and adequately due to the state of the lines, for example, of the access provider system 200 becoming inferior, the communication I/F 311 of the service provider system 300 detects this situation and informs the control unit 317 accordingly.

The control unit 317, based on this information, instructs the database I/F 315 to read out the image data for controlling, as well as instructing the selection unit 313 to transmit this image data for controlling, for example, all the user terminal devices 100. As a consequence, though the live pictures cannot be seen, halfway fragmentation of the image or transmission of poor quality image can be prevented. As a matter of course, if the state of the line may be maintained in good condition by transmitting such image data for controlling to only a part of the user terminal devices 100, a function of transmitting the live image to the other user terminal devices 100 may be maintained by performing such operation.

As described above, according to the communication system 11 of this embodiment, simultaneous communications among three or more users can be performed under an environment in the form of videophones capable of mutually transmitting real-time pictures, and communication among a plurality of users can be performed effectively.

At this event, each user can control the image data to be transmitted to each of the called parties. Accordingly, each user can make use of the communication system 11 in such form of videophone, as his live picture is not necessarily transmitted constantly. By this communication system 11, various convenient forms of communication are available.

For instance, when communication is requested by an unknown party, the user may display on the screen of the unknown party an image such as a landscape image to prevent from disclosing his identity, thereby assuring privacy. Furthermore, the user may be able to transmit a static image such as photography or a cartoon registered beforehand to a party who is his acquaintance but not intimate.

Thus, the user may select the image to show to the called party in accordance with the degree of intimacy, thereby allowing a more diversified communication environment.

When communication under high anonymity is conducted, communication may be activated by intentionally transmitting a picture or image that is not a live picture. Still, an expression of feeling may be conducted effectively by properly switching between the registered picture, the live picture or the like for transmission.

Moreover, the present invention is not limited to the embodiment described above, so that various arbitrary changes and variations are possible.

For instance, the service providing system comprising the access provider system 200 and the service provider system 300 is not limited to such the form as presented in the preferred embodiments described herein, but arbitrary forms are accepted.

For instance, the form in which the access provider concurrently provides such service, namely, a service system integrating the access provider system 200 with the service provider system 300 is acceptable.

Figure 9:
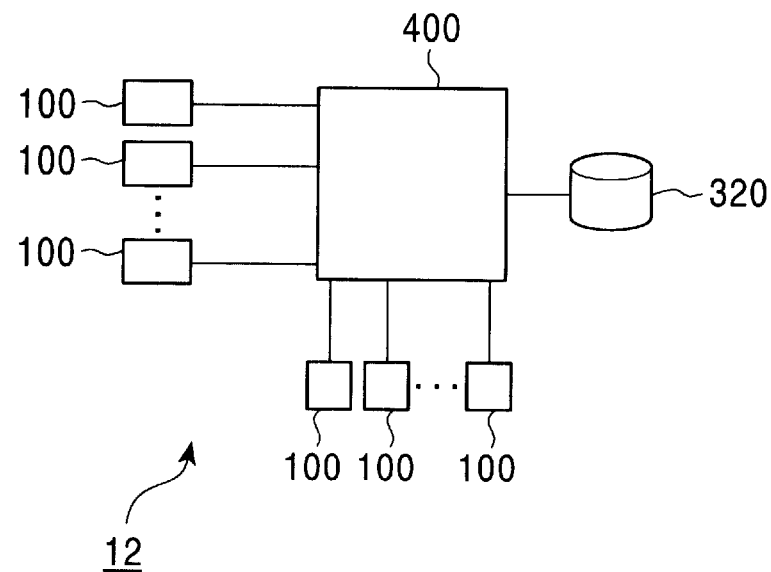
FIG. 9 is a block diagram showing a configuration of a communication system of another embodiment of the present invention.

FIG. 9 shows an example of such form with a simpler system.

A communication system 12 shown in FIG. 9 comprises a plurality of the user terminal devices 100, an access provider system 400 and a user database 320.

The access provider system 400 is a kind of switching system that allows communication by voice and image between arbitrary user terminal devices 100 according to a request from the user terminal devices 100.

The user database 320 is a database in which only a setting of whether the communication is conducted with image or not is done between each user.

In such configured communication system 12, the access provider system 400, according to request of any of the user terminal devices 100, makes a line connection between the user terminal devices 100, whereby communication in the form of Videophone between the pertinent user terminal devices are available.

In addition, at the time of making the line connection, the access provider system 400 makes a check of the user database 320 and determines whether or not transmission and reception of the image between the pertinent user terminal devices 100 are to be conducted, thereby making it possible to communicate only by voice between the user terminal devices 100 having no setting for transmission and reception of image. In other words, in such communication system 12, the user may arbitrarily set whether transmission and reception of image is conducted or not, and may obtain a similar effect to the communication system 11 of this embodiment.

Accordingly, the present invention can be effected in such form of the communication system 12.

Figure 11:
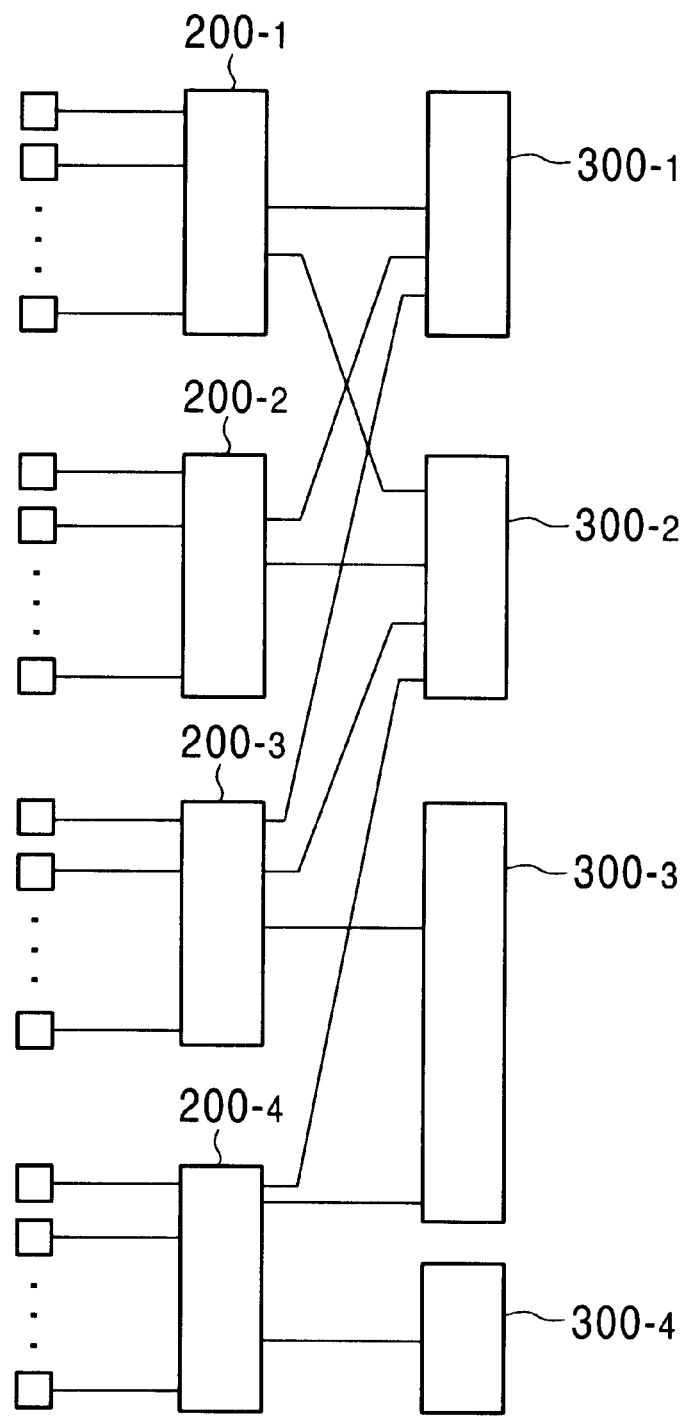
FIG. 11 is a view explaining another form of utilization of the communication system shown in FIG. 1.

In the embodiment of the present invention described above, a fundamental configuration is shown having the access provider system 200 and the service provider system 300 in a one-to-one correspondence. However, actually, as shown in FIG. 11, there is considered a form having a plurality of both the access provider systems 200 and the service provider systems 300, so it is also possible to adopt such configuration for the present invention.

In such case, the scope of the service target of each system may correspond with each other as shown in the access provider system 200₋₁, 200₋₂ and the service provider system 300₋₁, 300₋₂, and like the service provider system 300₋₃, configuration covering a plurality of the access provider system 200₋₃, 200₋₄ as the scope of the service target may be accepted. Conversely, like the access provider system 200₋₄, configuration of covering a plurality of the service provider system 300₋₃, 300₋₄ as the scope of the service target may also be accepted.

Furthermore, in the configuration in which a plurality of such access provider system and service provider system exist, the connection made via a system other than the access provider system of the original service target, or the connection to the service provider system of the original service target or the like may be conducted in the same manner as the system of the original service target by setting beforehand a predetermined rule for connection.

Such system is also within the scope of the present invention.

The utilization form of the communication system 11, though the above-described forms in any case refer to the communication conducted between a plurality of users, is not limited to such forms, but may be carried out in another arbitrary forms.

For instance, by utilizing that the user may register an image in the image database 330 of the service provider system 300, even a single user can use the system as a system for temporary data storage.

Figure 10:
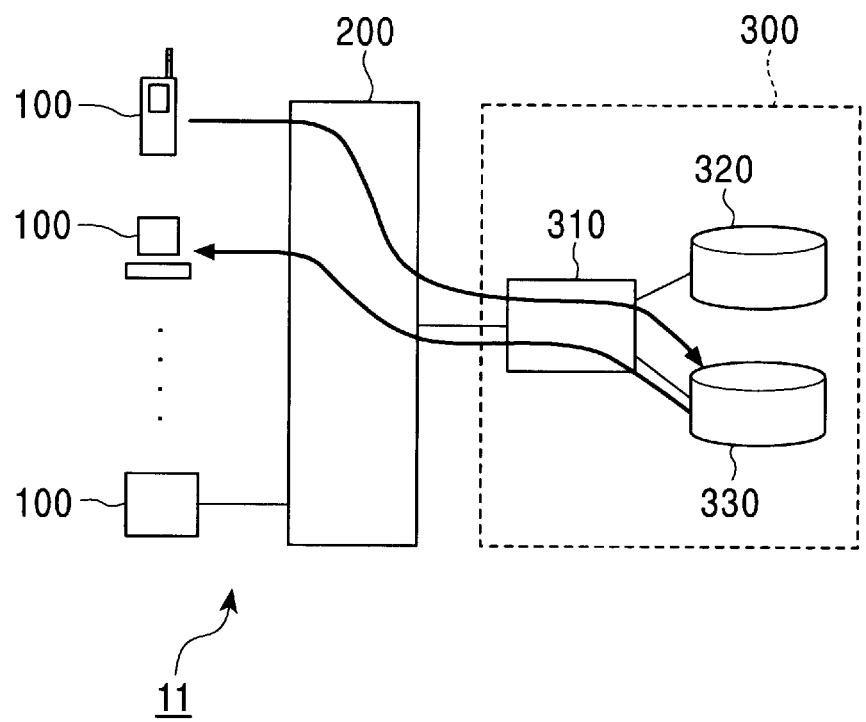
FIG. 10 is a block diagram showing a configuration of a communication system of further another embodiment of the present invention.

Such system is described by referring to FIG. 10.

As an example, when a user A comes upon some scene when out of home, which he wants to keep to record, user A captures the scene by a portable terminal device 101 and keeps it recorded as the above-described registered image data in the image database 330 of the service provider system 300 via the access provider system 200.

Upon returning home, for example, user A makes access to the service provider system 300 from a terminal device 102 such as a personal computer, which is suitable for processing image data, and may read out the recorded image data in an audio-visual form of the registered image.

Accordingly, a communication system related to the present invention may be utilized in such manner as described above.

The condition that each user sets in the user database 320 of the service provider system is not limited to only the communicated party like this embodiment of the present invention, so an arbitrary condition can be established.

For example, as shown in FIG. 12, the user may make the settings according to the time of communicating. By doing so, there is no fear that a live picture to show during sleeping or just waking-up is transmitted as it is to the communicated party, which makes it all the more easy to utilize such the communication system.

As a matter of course, such settings by time, by the communicated party or by other various conditions may be allowed to exist in conjunction.

Still, in this embodiment, data to be transmitted to the communicated party in place of the live picture, and data for controlling to be used due to limitation of the channel is set to be, in either case, image data. However, the data concerning the present invention are not limited to image data, and text data indicating arbitrary characters may also be accepted. Furthermore, data in the form of adding voice data or some sort of accompanied data to such the visually recognizable data may also be accepted.

There is also no limitation in image data with respect to the contents, the type (static image or moving image, real image, picture, photograph, cartoon, characters or the like), the forms, and the recording forms.

In addition, the data displayed on the terminal device of the communicated party in place of the live picture is, according to this embodiment, to be recorded in the service provider system 300. However, such data may also be recorded in the user terminal device of the user of the transmitting side, or in the user terminal device of the reception side if communication with the same party is made frequently.

According to the present embodiment of this invention, the operation unit of the user terminal device 100 is a key input unit, but an arbitrary inputting means or operating means such as, for example, a touch panel, a jog dial, a pen input, or a voice input is accepted.

Furthermore, an arbitrary method, kind or form may be used with respect to the connecting method for the access provider, the kind of communication network, the form of transmitting data, the form of the user terminal device or the like, and may not be limited to this embodiment of the present invention.

Thus, the present invention may provide a communication method capable of effectively communicating with enhanced capability of expression by making effective use of processing real-time moving image, thus having an increased convenience and ease of use.

Further, the present invention may provide a communication service apparatus which provides a communication service capable of effectively communicating with enhanced capability of expression by making effective use of processing real-time moving image and with increased convenience and ease of use, as well as a communication terminal device making use of such communication service, and a communication system to provide such communication service.

While preferred embodiments of the invention have been described, such description is for illustrative purpose only, and it is to be understood that changes and variations may be made within the spirit and scope of the invention.

What is claimed is:

1. A communication method comprising the steps of:
storing beforehand arbitrary data for each of a plurality of users;
connecting a plurality of communication terminal devices capable of simultaneous calls;
capturing a live image by at least one of said communication terminal devices;
transmitting live image data obtained by said capturing step to a server apparatus;
selecting for each of said communication terminal devices one of said live image data transmitted from said at least one communication terminal device and said data stored beforehand in accordance with indication from a user related to said at least one communication terminal device;
transmitting selected data according to said selecting step to said plurality of communication terminal devices; and
displaying said selected data related to said at least one communication terminal device on each of said plurality of connected communication terminal devices.

2. The method according to claim 1, wherein
said arbitrary data of each of said user is data including at least data to be displayed on a display device of said plurality of communication terminal devices.

3. The method according to claim 2, wherein
arbitrary data comprises data including one or plural members selected from a group of a static and a moving image showing one of said users, a static and a moving image showing a condition of said one user, and a static and a moving image of arbitrary contents selected by said one user, wherein said one or plural members selected from said group of data have a form added with voice related to said data, or a form whose contents are at least one of a photograph, a cartoon, an animation and a picture.

4. The method according to claim 1, wherein
each time said communication terminal device is connected to another communication terminal device capable of simultaneous calls, said communication terminal device transmits a selection signal for selecting data to said server apparatus, and selects, according to said transmitted selection signal; at said server apparatus, at least one of said live image data transmitted from said communication terminal device and said arbitrary data.

5. The method according to claim 1, wherein
said communication terminal device transmits beforehand indication data to said server apparatus for selecting data at said server apparatus;
said indication data to be transmitted is stored in said server apparatus; and
when said communication terminal device starts communication, at least one of said live image data transmitted from said communication terminal device and said arbitrary data stored beforehand is selected by reference to said indication data at said server apparatus.

6. The method according to claim 5, wherein
said indication data are data for specifying data to be selected and transmitted to each of said communication terminal devices.

7. The method according to claim 5, wherein
said indication data are data for specifying data to be selected and transmitted according to a connecting condition.

8. The method according to claim 7, wherein
said indication data are data for specifying data to be selected and transmitted according to connecting time.

9. The method according to claim 1, wherein
said arbitrary data of each user is stored in said server apparatus.

10. The method according to claim 1, wherein
arbitrary data of each of said user are stored in said communication terminal device related to said user.

11. The method according to claim 1, wherein
arbitrary data of each of said users are stored distributed in said server apparatus, said communication terminal device related to a user, and another communication terminal device possible to be connected to said communication terminal device.

12. The method according to claim 1, further comprising the steps of:
capturing a desired image at each of said communication terminal devices;
transmitting desired image data from said capturing step, as required, to said server apparatus and to another communication terminal device possible to be connected to said communication terminal device; and
storing said desired image data in either one or a plurality of said server apparatus, said communication terminal device or said another communication terminal device as said arbitrary data of said user related to said communication terminal device.

13. The method according to claim 1, further comprising the steps of:
storing beforehand a plurality of data for display in said server apparatus;
selecting arbitrary data for display from a plurality of said data for display stored beforehand, wherein said selecting step is conducted by each of said communication terminal device; and
storing said data from said selecting step for display in either one of or a plurality of said server apparatus, said communication terminal device, or said another communication terminal device as said arbitrary data of a user related to said communication terminal device.

14. The method according to claim 1, wherein
said server apparatus, according to a condition of a channel between a plurality of connected said communication terminal device, determines data to be transmitted to each of said communication terminal device, and transmits, irrespective of indication from said user.

15. The method according to claim 1, wherein
three or more of said communication terminal device are connected in a manner capable of simultaneous calls.

16. The method according to claim 1, further comprising the steps of:
inputting arbitrary data including desired image data in said communication terminal device;

transmitting data from said inputting step to said server apparatus;

storing data from said transmitting step in said server apparatus as said arbitrary data corresponding to a user related to said communication terminal device; and transmitting data from said storing step to a desired communication terminal device in accordance with a request from a user related to said communication terminal device.

17. A communication service apparatus comprising:

a plurality of communication terminal devices connected to be able to make simultaneous calls;

a selecting means for selecting for each of said communication terminal devices at least one of live image data to be transmitted from one of the communication terminal devices and data for display stored beforehand corresponding to a user related to said one communication terminal device, in accordance with an indication from said one user to each communication terminal device; and a transmitting means for transmitting said data from said selecting means to said one communication terminal device and to said another communication terminal device connected to be able to make said simultaneous calls.

18. The apparatus according to claim 17 further comprising:

a storage device for storing data for display capable of being displayed on said communication terminal device corresponding to a user.

19. The apparatus according to claim 18, wherein said storage device stores image data to be transmitted from each of said communication terminal device as said data for display corresponding to a user related to the one communication terminal device.

20. The apparatus according to claim 19, wherein said transmitting means, in accordance with a request from a user related to said one communication terminal device, transmits said image data stored in said storage device as said data for display to a desired communication terminal device.

21. The apparatus according to claim 18, wherein said storage device stores beforehand a plurality of data for display as well as storing a result of selection out of a plurality of said data for display transmitted from each of said communication terminal device as said data for display corresponding to a user related to said one communication terminal device.

22. The apparatus according to claim 17, further comprising:

a communication connecting apparatus for connecting a plurality of desired communication terminal devices capable of simultaneous calls.

23. The apparatus according to claim 22, wherein said communication connecting apparatus connects three or more of said communication terminal devices in a manner capable of simultaneous calls.

24. The apparatus according to claim 17, wherein said data for display to be stored beforehand corresponding to said user are data including either one of or a plurality of a static image and a moving image showing said user, a static image and a moving image showing a condition of said user, or a static image and a moving image of arbitrary contents selected by said user, and data including a form added with voice related to said data or a form whose contents are at least one of a photograph, a cartoon, an animation and a picture.

25. The apparatus according to claim 17, wherein said selecting means performs said selection in accordance with a selection signal to be transmitted from each of said communication terminal devices when a plurality of communication terminal devices are connected to be able to make simultaneous calls.

26. The apparatus according to claim 17, further comprising:

an indication data storing means for storing indication data to perform said selection, wherein said selecting means performs said selection by referring to said stored indication data when a plurality of communication terminal devices are connected to be able to make simultaneous calls.

27. The apparatus according to claim 17, wherein said transmitting means determines data for display to be transmitted to said communication terminal device as specific data according to a condition of channels between said connected communication terminal devices, and transmits, irrespective of indication from said user.

28. Communication terminal devices interconnected via a communication service system performing mutual calls, comprising:

calling means for effecting calls with another connected communication terminal device;

receiving means for receiving predetermined data related to another user transmitted from said communication service system;

displaying means for displaying said predetermined data related to a user of a called party, when said calling is being effected;

capturing means for capturing a desired live image;

image transmitting means for transmitting live image data obtained by said capturing to said communication service system; and data indication means for selecting and indicating at least one of said live image data to be transmitted and arbitrary data for display prepared in advance as data to be transmitted to each communication terminal device of each said called party, when said calling is being performed, wherein different predetermined data can be selected for each said called party.

29. The device according to claim 28, wherein said calling means is capable of simultaneous calls with two or more of other said communication terminal devices;

said receiving means receives each of said predetermined data from each user of said called parties; and said displaying means simultaneously display all of said predetermined data related to both parties effecting simultaneous calls on same screens.

30. The device according to claim 29, wherein said arbitrary data for display stored beforehand are data including either one of or a plurality of a static image and a moving image showing a user related to said communication terminal device, a static image and a moving image showing a condition of said user, or a static image and a moving image of arbitrary contents selected by said user, and data including a form added with voice related to said data or a form whose contents are at least one of a photograph, a cartoon, an animation and a picture.

31. The device according to claim 29, wherein
said data indicating means, according to operation of a user and each time newly connected to another communication terminal device, indicates said predetermined data to be transmitted to said connected communication terminal device.

32. The device according to claim 29, wherein
said data indicating means, according to operation of a user and for each of users possible to become called parties, indicates beforehand said predetermined data to be transmitted to said communication terminal device related to said user.

33. The device according to claim 29, wherein
said data indicating means, according to operation of a user and for each condition and situation of call, indicates beforehand said predetermined data to be transmitted to a communication terminal device related to said user of said called parties.

34. The device according to claim 29, wherein
said receiving means receives said predetermined data transmitted from said communication service system and related to a user possible to effect said calls, wherein said communication terminal device further comprises a storing means for storing said predetermined data which is received and related to said user possible to effect said call; and
said displaying means reads out and displays said predetermined data related to a user of said called party from said storing means, when calling is effected through said calling means.

35. The device according to claim 29, further comprising:
storing means for storing said data for display related to a user of said communication terminal device to be transmitted to a communication terminal device of a called party, wherein said communication terminal device reads out said data for display from said storing means for transmission to said communication service system when said data for display is selected as data to be transmitted to said communication terminal device of said called party in said data indicating means.

36. A communication system comprising:
a plurality of a communication terminal device;
a storage device for storing desired data corresponding to a user of said communication system; and
a communication service system for connecting between said communication terminal device capable of communicating mutually and for transmitting desired data stored corresponding to a user related to said communication terminal device to a desired communication terminal device in a desired form in accordance with a request from said communication terminal device, wherein said communication terminal device comprises a calling means, a capturing means for capturing a desired live image, a transmitting means for transmitting live image data obtained by said capturing, a receiving means for receiving arbitrary data including live image data to be transmitted, and a displaying means for displaying arbitrary data including said received live image data,
wherein said storage means store data including data for display capable of displaying on said displaying means of said communication terminal device adapted to a user of said communication system, and
wherein said communication service system connects a plurality of said communication terminal device capable of simultaneous calls, and selects, for each of said connected communication terminal device and according to an indication from a user related to said communication terminal device, at least one of said image data to be transmitted from said communication terminal device and said data for display stored corresponding to said user, and transmits said selected data to another said connected communication terminal device.

37. The system according to claim 36, wherein
said communication service system connects 3 or more of said communication terminal devices capable of simultaneous calls.

38. The system according to claim 36, wherein
said communication service system comprises a communication connecting apparatus for connecting arbitrary devices of a plurality of said communication terminal device with a communication service server apparatus, and the communication service server apparatus for selecting, according to an indication from a user related to said communication terminal device, at least one of said live image data to be transmitted from said communication terminal device and said data for display stored corresponding to said user, and for transmitting said selected data to another said connected communication terminal device.

39. The system according to claim 38, wherein said storage device is constructed within said communication service server apparatus.

40. The system according to claim 36, wherein
said communication terminal device, when connected to another communication terminal device capable of simultaneous calls, transmits to said server apparatus said selection signal for selecting said data;
said communication service system, according to said selection signal to be transmitted, selects at least one of said live image data to be transmitted from said communication terminal device and said data for display stored corresponding to said user.

41. The system according to claim 36, wherein
said communication terminal device transmits an indication data for selecting data beforehand at said communication service system to said communication service system; and
said communication service system stores said transmitted indication data, and when said communication terminal device begins to communicate, selects at least one of said live image data transmitted from said communication terminal device and said stored data for display corresponding to said user, by referring to indication data stored in said storage device.

42. The system according to claim 36, wherein
said storage device is configured distributed in each communication terminal device in the form of storing in said communication terminal device desired data corresponding to a user related to said communication terminal device.

43. The system according to claim 36, herein
said storage device is constituted distributed in each communication terminal device in a form of storing in said communication terminal device a desired data corresponding to a user related to another communication terminal device possible to be connected with said communication terminal device.

44. The system according to claim 36, wherein each of said communication terminal device captures a desired live image, and transmits said live image data obtained by said capturing to said storage device; and said storage device stores said transmitted live image data as said arbitrary data of a user related to said communication terminal device.

45. The system according to claim 36, wherein said storage device stores beforehand a plurality of data for display;

each of said communication terminal device selects a desired data for display out of a plurality of data for display stored in said storage device; and said storage device stores said selected data for display as said arbitrary data of a user related to said communication terminal device.

46. The system according to claim 36, wherein said communication service system, according to a condition of channels between a plurality of said connected communication terminal device, determines data to be transmitted to each of said communication terminal device and transmits, irrespective of indication from said user.

* * * * *

UNITED STATES PATENT AND TRADEMARK OFFICE
CERTIFICATE OF CORRECTION

PATENT NO. : 6,600,508 B2
DATED : July 29, 2003
INVENTOR(S) : Nakade et al.

It is certified that error appears in the above-identified patent and that said Letters Patent is hereby corrected as shown below:

Title page,
Item [73], Assignee, should read -- Sony Corporation, Tokyo (JP) --

Signed and Sealed this

Seventh Day of September, 2004

JON W. DUDAS
*Director of the United States Patent and Trademark Office*